United States Patent [19]

Basiulis et al.

[11] 4,331,200
[45] May 25, 1982

[54] PASSIVE FLOW MIXING FOR OSMOTICALLY PUMPED HEAT PIPES

[75] Inventors: Algerd Basiulis, Redondo Beach; Charles P. Minning, South Pasadena, both of Calif.

[73] Assignee: Hughes Aircraft Company, Culver City, Calif.

[21] Appl. No.: 106,984

[22] Filed: Dec. 26, 1979

[51] Int. Cl.³ .............................................. F28D 15/00
[52] U.S. Cl. ................................. 165/104.22; 417/53; 417/208
[58] Field of Search .......................... 165/105, 104.22; 417/48, 53, 207–209

[56] References Cited

U.S. PATENT DOCUMENTS 3,561,525 2/1971 Baer ..................................... 165/105
3,677,337 7/1972 Midolo ................................ 165/105
4,193,398 3/1980 Refson .............................. 417/48 X Primary Examiner—Carlton R. Croyle
Assistant Examiner—Edward Look
Attorney, Agent, or Firm—Lewis B. Sternfels; W. H. MacAllister

[57] ABSTRACT

A high concentration gradient across a solvent permeable membrane (20), separating the solution and solvent reservoirs (12, 16) or an osmotic pumped heat pipe (10), is effected by inducing convection currents across the membrane material on its solution reservoir side (34). The induced convection current is created by the difference in densities of rich and lean solute-solvent mixtures which are caused respectively to traverse separate paths (40, 42). These convection currents sweep and mix with the solvent which has been freshly pumped through the membrane from the solution reservoir side (34).

10 Claims, 7 Drawing Figures

PASSIVE FLOW MIXING FOR OSMOTICALLY PUMPED HEAT PIPES

The Government has rights in this invention pursuant to Contract No. F33615-77-C-3031 awarded by the Department of the Air Force.

TECHNICAL FIELD

The present invention relates to osmotically pumped heat pipes and, in particular, to means and method for maintaining high pumping therein.

BACKGROUND ART AND OTHER CONSIDERATIONS

In osmotically pumped heat pipes, the pumping rate of solvent through a solvent permeable membrane is controlled by the concentration gradient between the solvent and a solute-solvent mixture on opposite sides of the membrane. In order to maintain high pumping rates, the concentration gradient must be maintained as high as possible. Otherwise, flow through the membrane will decrease with time as solvent, which is freshly pumped through the membrane from the solvent reservoir side thereof, forms a film on the solution side of the membrane. Although this freshly pumped solvent does mix with the solution, it does so slowly and, even then, dilutes the solution. The result is to decrease the high concentration gradient on either side of the membrane, and to decrease correspondingly the pumping rates. This problem has been overcome in the past by use of mechanical pumping of solute past the membrane surface to remove the freshly pumped solvent. This technique consumes power and reduces system reliability.

SUMMARY OF THE INVENTION

The present invention overcomes the above problems by inducing passage of a convection current across the membrane material on its solution side, specifically by displacing freshly pumped solvent by a rich solute-solvent mixture. The preferred method for inducing such a convection current is the utilization of a pair of concentric tubes extending from the membrane into the evaporator section of the solution reservoir for establishing separate paths by which a solvent current is caused to move away from the membrane to the evaporator and by which a solution current is caused to move away from the evaporator to the membrane side.

It is, therefore, an object of the present invention to provide means and method for maintaining high pumping rates in osmotically pumped heat pipes.

Another object is to maintain a high concentration gradient between the solvent and solvent-solute mixture sides of a solvent permeable membrane in such a heat pipe.

Another object is to provide a means and method for inducing concentrated solution flow past the membrane and thus to sweep solvent therefrom.

Other aims and objects as well as a more complete understanding of the present invention will appear from the following explanation of exemplary embodiments and the accompanying drawings thereof.

DETAILED DESCRIPTION OF THE INVENTION

Figure 1:
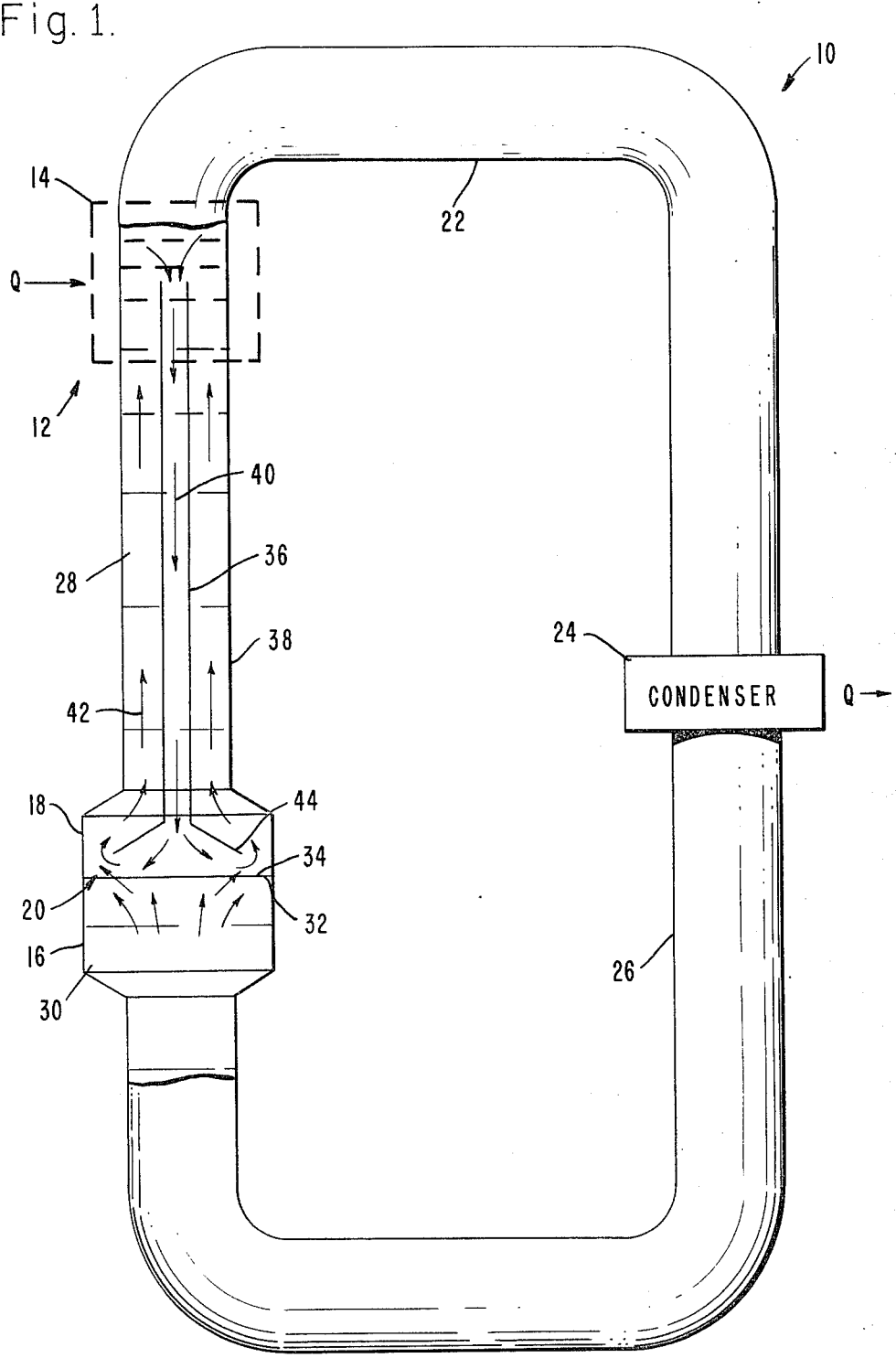
FIG. 1 is a general view of an osmotically pumped heat pipe illustrating a first embodiment of the present invention.

Referring to FIG. 1, an osmotically pumped heat pipe 10 comprises a solution reservoir 12 including a evaporator section 14, a solvent reservoir 16, a mixing manifold 18, a solvent permeable membrane 20 between the solvent reservoir and the mixing manifold, a vapor transport tube 22 connecting evaporator 14 with a condenser 24, and a solvent condensate collector tube 26 connecting the condenser with solvent reservoir 16. Heat, designated by indicium "Q" is applied to evaporator 14 as denoted by the direction of the arrowhead, while heat is withdrawn from the system at condenser 24 as denoted by "Q" and the arrow pointing away from the condenser. A solution 28 of a suitable solute and solvent mixture is placed within solution reservoir 12 while a solvent 30 resides within solvent reservoir 16.

In operation, heat applied to evaporator section 14 causes solvent to evaporate from solution 28, and the solvent vapors move through tube 22 to condenser 24. The condenser removes heat from, and thereby condenses, the vapor and the condensate replenishes solvent 30 within solvent reservoir 16. Solvent is osmotically pumped through membrane 20 from its solvent reservoir side 32 to its solution reservoir side 34 in mixing manifold 18.

As described before, a film of solvent normally collects and concentrates on membrane side 34 as a product of the concentration polarization effect, which is a major cause of degradation of osmotic pumped performance. To remove this solvent film, an inner tube 36 is placed in general concentric configuration within an outer tube 38 which, as shown, forms a basic enclosure for solution reservoir 12. As shown, tube 36 transports a rich solute-solvent mixture along a path from evaporator 14 to membrane 20 while the space between tubes 36 and 38 forms the path for a weak solution diluted with freshly pumped solvent moving from membrane 20 into evaporator 14. The designation of particularly described flow paths within tube 36 and between tubes 36 and 38 is not necessary; the dilute solution may be caused to traverse a path through tube 36 while the rich solute-solvent mixture may be caused to traverse a path defined by the space between tubes 36 and 38, cf. FIGS. 5 and 6.

The as-depicted flow of rich solute-solvent mixture through tube 36 as denoted by arrows 40 and flow of a lean solute-solvent mixture as depicted by arrows 42 is encouraged by use of a funnel 44 which extends from the opening of tube 36 above membrane 20.

Thus, osmotically pumped heat pipe 10 is now caused to operate more efficiently due to the formal establishment of convection currents. Membrane 20, which separates the solvent and solute-solvent mixture, enables solvent 30 to flow through the membrane into mixing manifold 18, because of the concentration gradient. The solvent then mixes with solute-solvent mixture 28 which becomes a dilute mixture for flow upward along the path designated by arrows 42 to evaporator 14. Heat "Q" at the evaporator converts liquid solvent to a vapor. The heavier solute-solvent mixture then flows down, as shown by arrows 40, through tube 36 to membrane 20 because its desity is higher than that of the leaner mixture flowing upwardly into the evaporator. At the membrane surface, the rich mixture flowing through tube 36 sweeps the solvent away from membrane surface 34 while mixing with it and the dilute mixture then flows up to the evaporator along the path between tubes 36 and 38.

Figure 2:
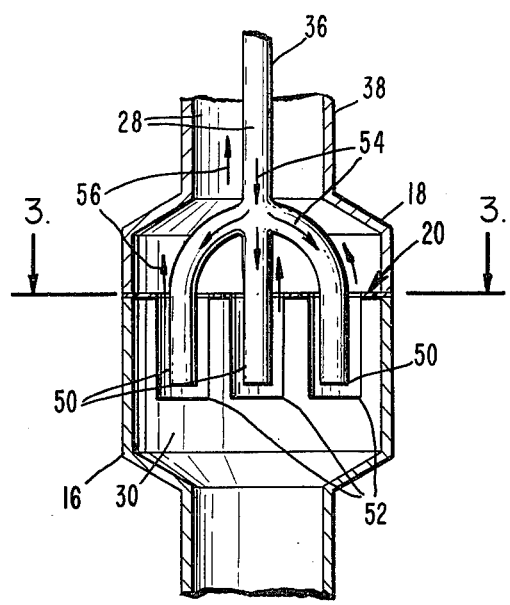
FIG. 2 depicts a view of a second embodiment of solvent reservoir and mixing manifold assemblies modified with respect to those shown in FIG. 1.
Figure 3:
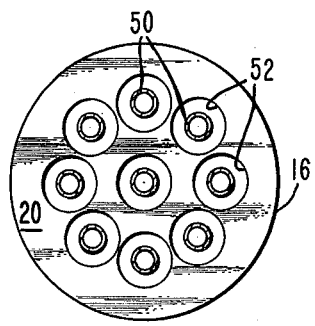
FIG. 3 is a cross-sectional view of the modification of FIG. 2 taken along lines 3—3 thereof.
Figure 4:
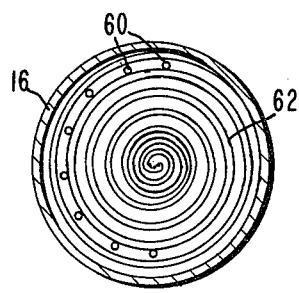
FIG. 4 depicts a view similar to that of FIG. 3 but further modified to illustrate a spirally-wrapped module.

The shapes and configurations of membrane 20, as well as the envelopes and separator tubes, may be varied as desired. Thus, heat pipe 10 can operate with a single membrane as depicted in FIG. 1 or with membrane modules with flow separating mixing devices as depicted in FIGS. 2–4. In FIGS. 2 and 3, solution transfer tube 36, rather than terminating in funnel 44 of FIG. 1, is separated into a plurality of solution mixing tubes 50, and membrane 20 of FIG. 1 is separated into a plurality of corresponding membrane tubes 52. The result of this configuration increases the surface area of solvent permeable membrane 20 of FIG. 1 manifold to that depicted in FIGS. 2 and 3 to provide a greater pumping capability for the heat pipe.

In a manner similarly described with respect to FIG. 1, a rich solute-solvent mixture separates into a plurality of paths as depicted by arrows 54 while a lean solute-solvent mixture flows upwardly as depicted by arrows 56.

Instead of utilizing the tubular configuration, a spirally-wrapped configuration may be employed as shown in FIG. 4 in which a plurality of rich mixture tubes 60 are placed within a spirally-wrapped membrane 62 extending within and from solvent reservoir 16. The operation of the system is as described previously.

Figure 5:
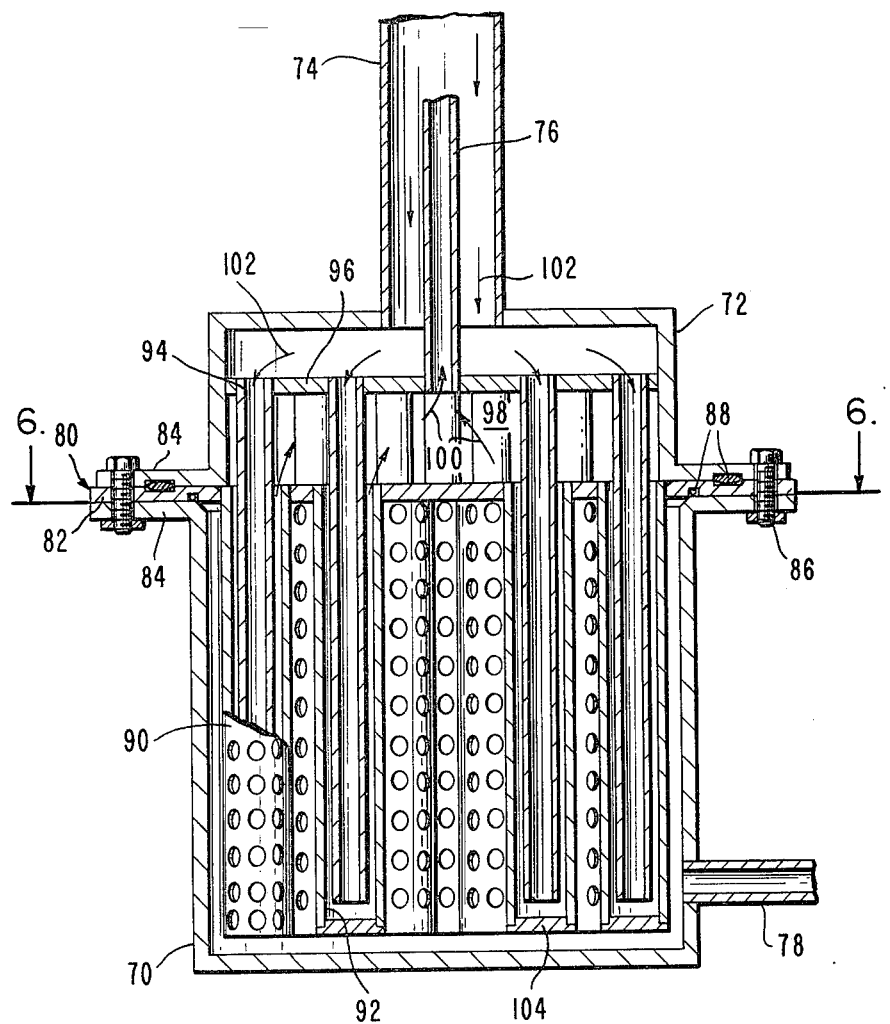
FIG. 5 is a cross-sectional view of a further and preferred embodiment of the present invention.
Figure 6:
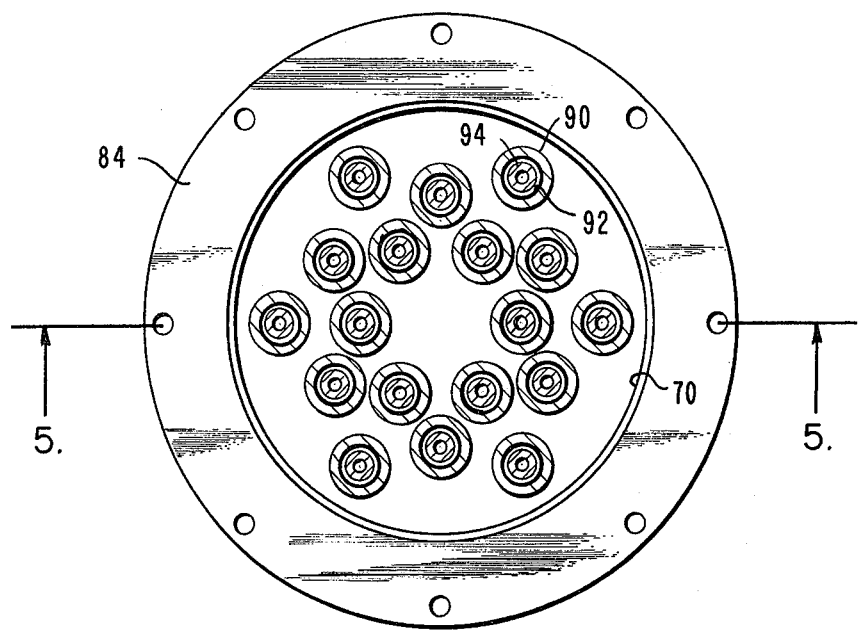
FIG. 6 is a view taken along lines 6—6 of FIG. 5.
Figure 7:
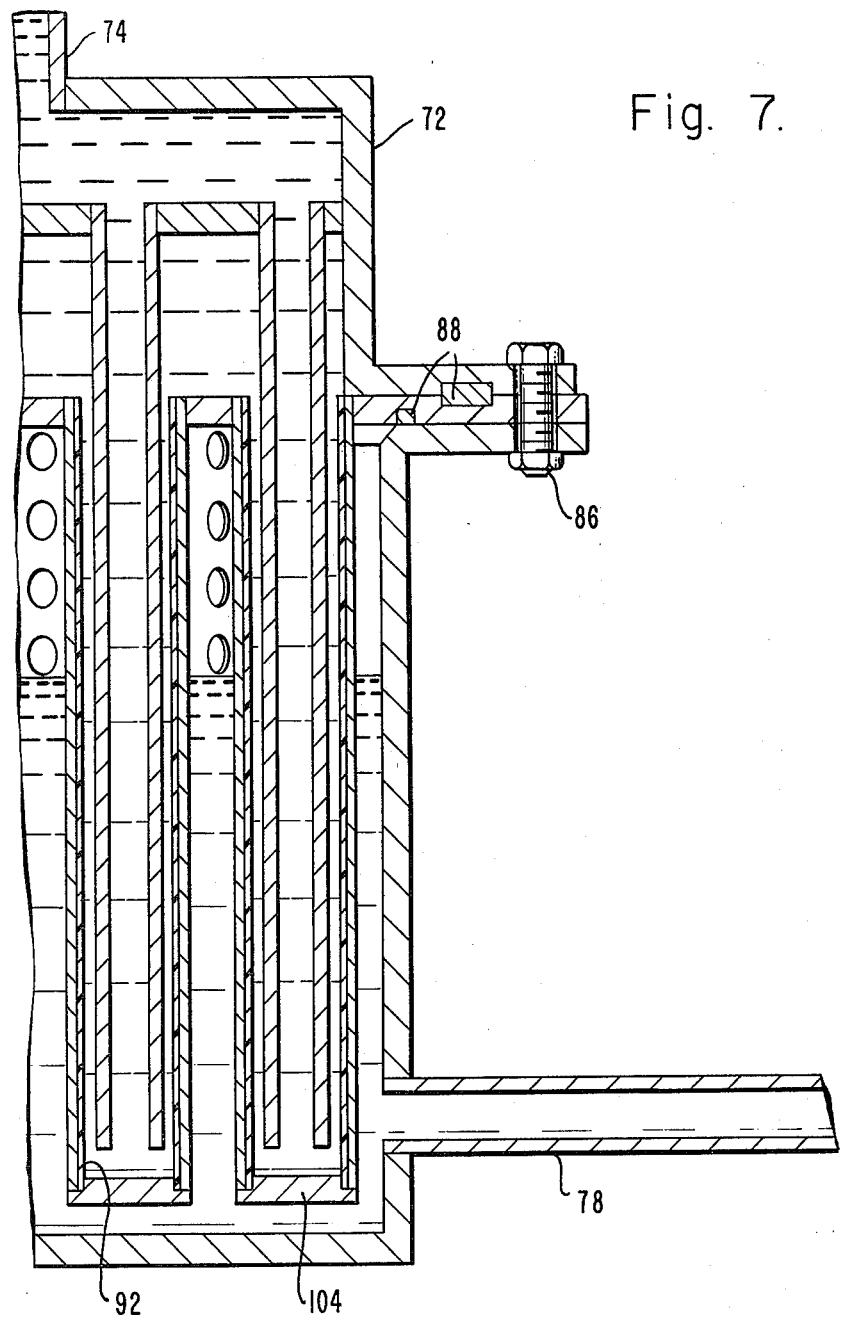
FIG. 7 is an enlargement of the embodiment shown in FIG. 5.

Referring now to FIGS. 5, 6 and 7, a preferred embodiment of the present invention comprises a solvent reservoir 70 coupled through a mixing manifold envelope 72 to a solution reservoir, such as reservoir 12 of FIG. 1, through solution transport tubing 74 and solution transfer tubing 76. A condensate return tube 78 is coupled through a condenser, such as condenser 24 of FIG. 1, to the evaporator section of the solution reservoir. Such a combination of solvent reservoir 70 and mixing manifold envelope 72 and its component parts are also described in copending patent application Ser. No. 106,986 entitled "Self Equalizing Control Mechanism for Osmotically Pumped Heat Pipes" by Robert A. Anderson and George L. Fleischman, filed herewith.

In this embodiment, a membrane assembly 80 is secured in place at its flange 82 between flanges 84 respectively terminating solvent reservoir 70 and mixing manifold envelope 72. Securement may be any suitable means, such as bolt, lock washer and nut combination 86. Copper ring gaskets 88, placed between flange 82 and respective flanges 84, provide a fluid-tight seal. Membrane assembly 80 is completed by a plurality of perforate support tubes 90 which support a plurality of solvent permeable membranes 92. Disposed within membrane tubes 92 respectively are a plurality of solution mixing tubes 94 which are supported by a solution mixing flange 96, in turn secured to mixing manifold envelope 72. Solution transfer tubing 76 extends from flange 96 and communicates with a solvent collecting space 98.

Thus, solvent, which is freshly pumped through membrane tubing 92, mixes with the rich solution furnished through tubes 94 and within chamber 98. The dilute solution flows upward through solution transfer tubing 76 along the path denoted by arrows 100 into the evaporator. Evaporation of solvent therefrom produces a rich solute-solvent mixture, which flows downwardly between tubes 74 and 76 along the path denoted by arrows 102 into solution mixing tubes 94. The rich mixture therefore extends to the bottom of perforate support tubing 90 to its membrane cylinder caps 104 and then upward between tubes 94 and membrane tubes 92 into space 98 to sweep and mix with the freshly pumped solvent.

Although the invention has been described with reference to particular embodiments thereof, it should be realized that various changes and modifications may be made therein without departing from the spirit and scope of the invention.

What is claimed is:

1. In an osmotically pumped heat pipe having solution and solvent reservoirs and solvent permeable membrane material separating said reservoirs, the improvement in maintaining a high concentration gradient across said membrane material comprising means for passively inducing directed convection currents across the membrane material on its solution reservoir side.

2. The improvement according to claim 1 wherein said directed convection current inducing means comprises means for displacing solvent, freshly pumped through said membrane material from said membrane side, by a rich solute-solvent mixture.

3. The improvement according to claim 2 wherein said directed convection current inducing means includes separate paths for said freshly pumped solvent and for said rich solvent-solute mixture.

4. In an osmotically pumped heat pipe having solution and solvent reservoirs and solvent permeable membrane material separating said reservoirs, the improvement in maintaining a high concentration gradient across said membrane material comprising separate paths for solvent, freshly pumped through said membrane material to its solution reservoir side, and for a rich solute-solvent mixture in said solution reservoir for displacing said freshly pumped solvent by said rich solvent-solute mixture, said separate paths including concentric tubing extending adjacently from said membrane side and into said solution reservoir.

5. The improvement according to claim 4 wherein said membrane material includes a tubular configuration extending into and from said solvent reservoir, and said concentric tubing extends within said tubular membrane configuration.

6. The improvement according to claim 4 wherein said membrane material comprises a plurality of tubes extending into and from said solvent reservoir, and said concentric tubing comprises a plurality of tubes extending respectively into said tubes of membrane material.

7. The improvement according to claim 6 further including a plurality of perforate tubes supported in said solvent reservoir and respectively supporting said tubes of membrane material.

8. In an osmotically pumped heat pipe having solution and solvent reservoirs and solvent permeable membrane material separating said reservoirs, the improvement in maintaining a high concentration gradient across said membrane material comprising separate paths for solvent, freshly pumped through said membrane material to its solution reservor side, and for a rich solute-solvent mixture in said solution reservoir for displacing said freshly pumped solvent by said rich solvent-solute mixture, said separate paths including concentric tubing extending between said solution and solvent reservoirs for establishing a solvent current moving away from said membrane side into said solution reservoir and to an evaporator therein, and a solution current moving away from said evaporator and to said membrane side.

9. A method for maintaining a high concentration gradient across solvent permeable membrane material in an osmotically pumped heat pipe comprising the step of passively inducing a directed convection current across the membrane material on its solution side.

10. A method according to claim 9 wherein said inducing step comprises the step of displacing solvent, freshly pumped through the membrane material from said membrane material solution side, by a rich solute-solvent mixture.

* * * * *